United States Patent
Tatar et al.

(10) Patent No.: US 8,165,144 B2
(45) Date of Patent: Apr. 24, 2012

(54) SHAPER-SCHEDULING METHOD AND SYSTEM TO IMPLEMENT PRIORITIZED POLICING

(75) Inventors: Mohammed Ismael Tatar, Kanata (CA); Clarence Filsfils, Brussels (BE); John Bettink, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 893 days.

(21) Appl. No.: 11/205,336

(22) Filed: Aug. 17, 2005

(65) Prior Publication Data

US 2007/0041390 A1    Feb. 22, 2007

(51) Int. Cl.
*H04L 12/28* (2006.01)
*G01R 31/08* (2006.01)

(52) U.S. Cl. ............................... 370/412; 370/230.1
(58) Field of Classification Search ............ 370/230.1, 370/412
See application file for complete search history.

(56) References Cited

U.S. PATENT DOCUMENTS

| | | | |
|---|---|---|---|
| 5,864,540 A | 1/1999 | Bonomi et al. | |
| 6,091,709 A * | 7/2000 | Harrison et al. | 370/235 |
| 6,130,878 A | 10/2000 | Charny | |
| 6,408,005 B1 | 6/2002 | Fan et al. | |
| 6,560,230 B1 * | 5/2003 | Li et al. | 370/395.42 |
| 6,633,835 B1 * | 10/2003 | Moran et al. | 702/190 |
| 6,775,232 B1 * | 8/2004 | Ah Sue et al. | 370/230.1 |
| 6,798,746 B1 * | 9/2004 | Kloth et al. | 370/235 |
| 7,266,606 B2 * | 9/2007 | Ganti et al. | 709/226 |
| 2002/0191622 A1 * | 12/2002 | Zdan | 370/401 |
| 2004/0257997 A1 * | 12/2004 | Loewen et al. | 370/235 |
| 2006/0092845 A1 * | 5/2006 | Kwan et al. | 370/235 |
| 2006/0187949 A1 * | 8/2006 | Seshan et al. | |
| 2010/0118883 A1 * | 5/2010 | Jones et al. | 370/412 |

* cited by examiner

*Primary Examiner* — Derrick Ferris
*Assistant Examiner* — Angel Brockman
(74) *Attorney, Agent, or Firm* — Cindy Kaplan

(57) ABSTRACT

A scheduling method and system for a multi-level class hierarchy are disclosed. The hierarchy includes a root node linked to at least two groups. One of the groups has priority over the other of the groups and comprises at least one high priority queue and at least one low priority queue. The method includes receiving traffic at the root node, directing traffic received at the root node to one of the groups, and directing traffic received at the priority group to one of the high priority and low priority queues. Packets are accepted at the high priority queue or the low priority queue if a specified rate is not exceeded at the high and low priority queues and at least some packets are dropped at the low priority queue if the specified rate is exceeded at the high and low priority queues.

18 Claims, 3 Drawing Sheets

SHAPER-SCHEDULING METHOD AND SYSTEM TO IMPLEMENT PRIORITIZED POLICING

BACKGROUND OF THE INVENTION

The present invention relates generally to communication networks, and more specifically, to shaper-scheduling methods and systems for implementing prioritized policing.

High speed networks are designed to carry services with a wide range of quality-of-service (QoS) requirements. Several datapath mechanisms have been proposed to satisfy various QoS requirements. One example is MLEF PHB (Multi-Level Expedited Forwarding Per Hop Behavior). The conceptual idea of MLEF PHB is to use a priority queue supplemented with a policer with various levels (thresholds) for different precedence levels. The different thresholds intend to facilitate dropping lower precedence packets before the higher precedence packets. One difficulty with MLEF is finding a suitable trade-off between sufficient threshold spacing across all levels to ensure appropriate differentiation across precedence levels (irrespective of packet arrival order) and short enough overall queue size to ensure sufficiently tight jitter bounds.

A conventional approach for prioritized policing is to utilize a policer to discard packets based on their precedence levels. The policer should not drop any packets when the traffic does not exceed the aggregate policing rate. When the traffic exceeds the aggregate policing rate, the policer should drop packets of lower priority levels to make room for packets of higher priority levels. Coupled policers (CP) may also be used. The coupled policers build upon the simple token bucket policer by allowing tokens to be shared among different token buckets. However, if multiple classes draw tokens from a common bucket, the resulting behavior depends on the arrival order and may introduce undesirable delays.

It is useful to define a hierarchy of traffic classes over which QoS requirements may be configured. A system which combines hierarchical shaping and scheduling with priority propagation is therefore desirable.

SUMMARY OF THE INVENTION

A scheduling method and system for a multi-level class hierarchy are disclosed. The hierarchy includes a root node linked to at least two groups. One of the groups has priority over the other of the groups and comprises at least one high priority queue and at least one low priority queue. The method includes receiving traffic at the root node, directing traffic received at the root node to one of the groups, and directing traffic received at the priority group to one of the high priority and low priority queues. Packets are accepted at the high priority queue or the low priority queue if a specified rate is not exceeded at the high and low priority queues and at least some packets are dropped at the low priority queue if the specified rate is exceeded at the high and low priority queues.

In another aspect of the invention, a computer program product for a multi-level class hierarchy includes a root node linked to at least two groups, wherein one of the groups is a high priority group which has priority over the other of the groups and has at least one high priority queue and at least one low priority queue. The product generally comprises: code that causes traffic received at the root node to be directed to one of the groups; code that causes traffic received at the priority group to be directed to one of the high priority and low priority queues; and a computer-readable medium that stores the codes. Packets are accepted at the high priority queue or the low priority queue if a specified rate is not exceeded at the high and low priority queues and at least some packets are dropped at the low priority queue if the specified rate is exceeded at the high and low priority queues.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. A traffic management system or network processor utilizing the method and system described herein may be located in one or more of the network elements. The system may be used, for example, in a router or switch platform that performs queuing and packet scheduling, or any device that is attempting to police traffic.

The network elements receive packets originated by various user agents which are devices such as telephones, video phones, computers, etc. The precedence level of each packet is determined and assigned by the user agent, possibly in conjunction with some authentication mechanism. The assigned precedence level may be inferred from information in the packet header. A service rate is available collectively to the traffic under consideration (e.g., traffic at a network element or node). To enforce the relative priority access to bandwidth across precedence levels, packets from the lower precedence may be dropped to allow higher precedence packets to flow, as described below.

Figure 1:
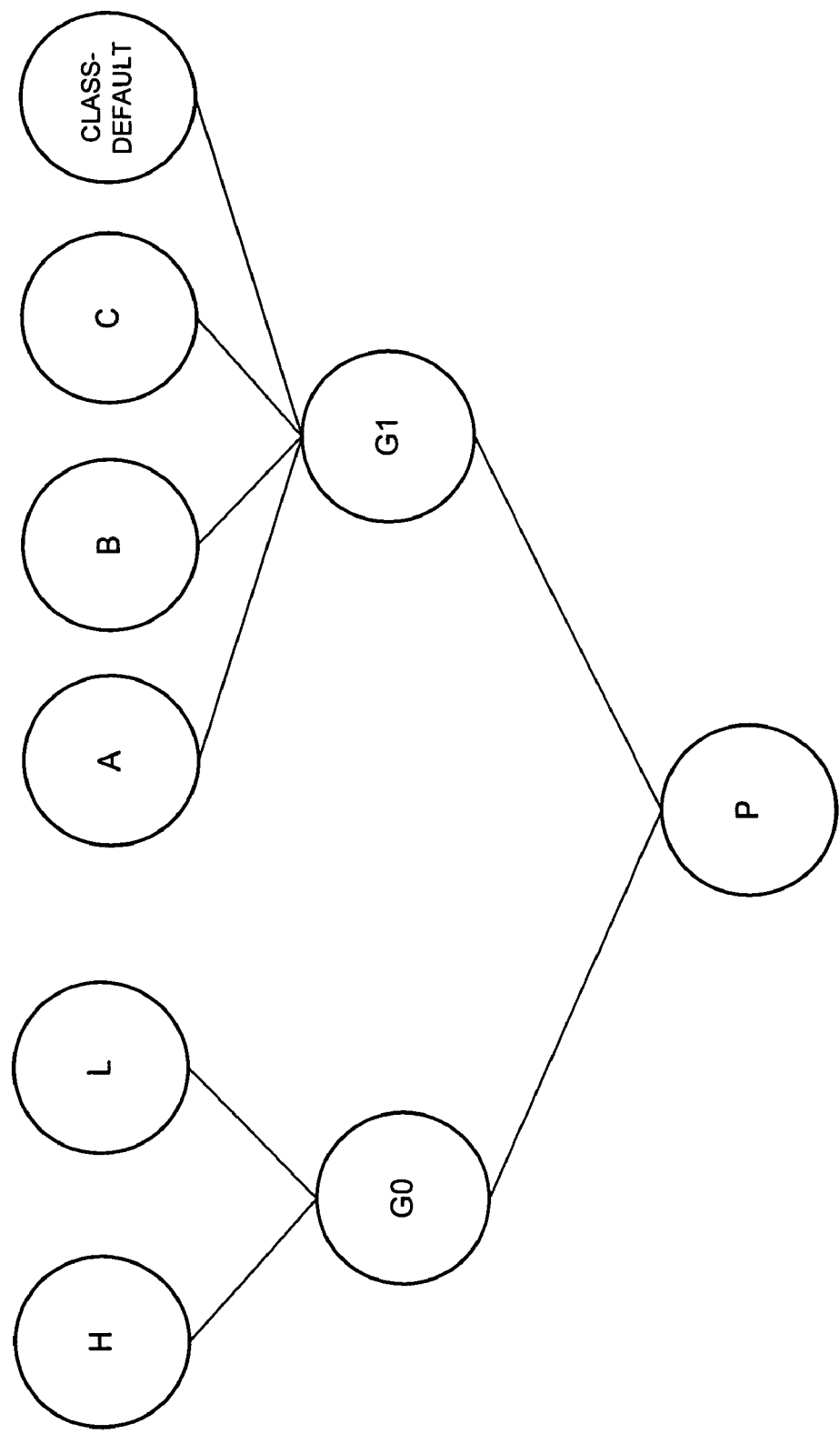
FIG. 1 illustrates a queuing hierarchy for use in one embodiment of the present invention.

A system and method of the present invention combine hierarchical shaping and scheduling with priority propagation. The system is configured to achieve behavior provided by coupled policers without the use of coupled policers. The present invention is described below with reference to a particular example as it applies to a scheduling hierarchy. In FIG. 1, there are three layers of hierarchy and two levels of priority, at two layers of the multi-level class hierarchy. It is to be understood, however, that the invention is not limited to any particular number of hierarchy levels, number of priority levels, or number or arrangement of nodes.

One embodiment of a hierarchy of the present invention is shown in FIG. 1. The hierarchy includes three layers. The first level or root is a node or port P defining a physical interface (or subinterface (e.g., ATM PVC, Ethernet V:LAN, FR DLCI)) over which traffic will be transmitted. The physical layer represents all physical layer entities, such as Ethernet ports, TDM channels, POS ports, etc. The next level of hierarchy includes two groups G0, G1. A third level of hierarchy consists of classes. The class layer contains packet queues where packets are queued awaiting transmission. When packets arrive they are placed in a queue associated with one of the classes. Individual groups or classes can be configured as priority nodes, which have higher scheduling preference than their siblings regardless of other scheduling criteria. For example, voice traffic may be assigned to a priority class. In the embodiment shown in FIG. 1, G0 has an associated class X, made up of two subclasses; H (high priority) and L (low priority). Group G1 has four queues A, B, C, and class-default. Each subclass is serviced by a separate queue; queue H for H's traffic, queue L for L's traffic; queue A for A's traffic, queue B for B's traffic, queue C for C's traffic, and queue class-default for class-default traffic. The data queues of Group 1 (A, B, C, class-default) are configured with a conventional queuing structure, as is well known by those skilled in the art. The queuing structures of queue H and queue L are described below. It is to be understood that the number of queues used for each group may be different than shown herein without departing from the scope of the invention.

Groups G0 and G1 share the physical wire's bandwidth. G0 is a priority group, which has priority over G1. G1 therefore gets what remains after queues H and L have been serviced. The remaining bandwidth is allocated to G1 and then reallocated between the A, B, C, and class-default queues.

The system is configured to shape group G0 (class X (subclasses H and L)) at an aggregate rate R and an aggregate burst B. Thus, the traffic at queues H and L is collectively limited to rate R and burst B. Subclass H is configured with priority over subclass L. Subclass H is policed at rate R and burst B. If the combined traffic at subclasses H and L is less than the aggregate rate R, all traffic is accepted. However, if the combined traffic at subclasses H and L exceeds rate R and traffic at H is less than rate R, some of the traffic at subclass L is dropped so that the aggregate rate R is enforced across class X. No traffic at H is dropped as long as the traffic at H does not exceed rate R or burst B.

The high priority queue H is configured with priority propagation. This means that a priority indication can be passed on a per-packet basis from a node to its parent. The priority propagation behavior thus allows low latency behavior to be delivered through the hierarchy from subclass to root. The high priority queue H is policed at rate R and burst B with exceed=drop. The policing of the queue is needed with priority propagation to avoid having an unlimited queue starve the system as it bypasses the common shaper.

The low priority queue L is configured to have a very small tail-drop limit (e.g., =1). L is alone in the shaped queue. As the load of H is still accounted within the shaping rate, queue L is effectively constrained to what remains.

The system is preferably configured such that no jitter is introduced for subclass H and any jitter introduced on subclass L is minimized. H benefits from priority propagation and is therefore never limited by the shaper. This results in no jitter impact on H. The jitter impact on L is controlled by setting the tail-drop limit of queue L.

Figure 2:
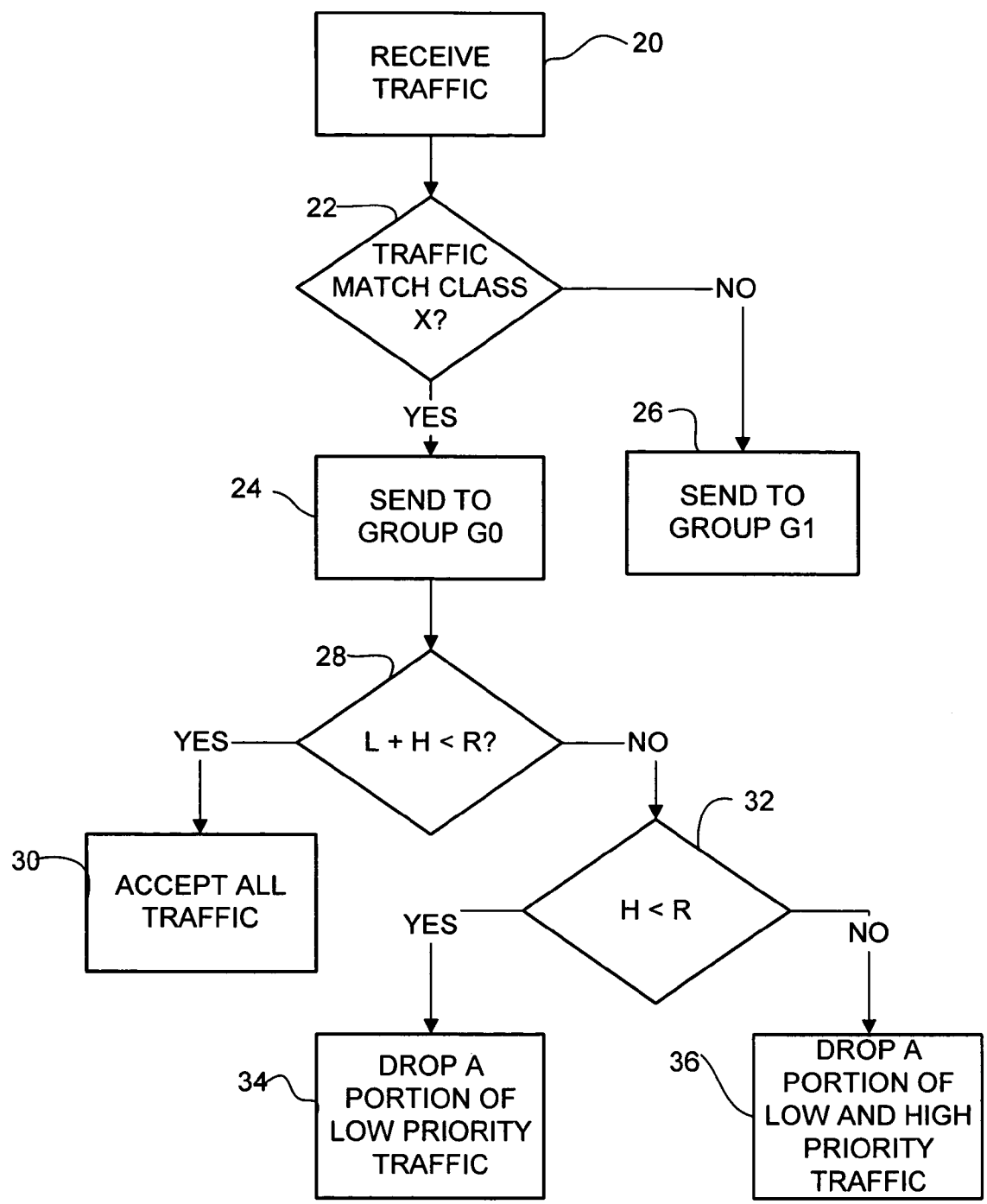
FIG. 2 is a flowchart illustrating a process for prioritized policing according to one embodiment of the present invention.

FIG. 2 is a flowchart illustrating an example of a shaper-scheduling technique to implement prioritized policing utilizing the system described above. Traffic matching class X (either subclass H or subclass L) is directed to Group G0 (steps 20, 22, and 24). Traffic matching classes other than X is directed to Group G1 (steps 22 and 26). If the rate at H and the rate at L is less than a predefined aggregate rate R, all traffic is accepted (steps 28 and 30). If H<R and H+L>R then a ratio of L traffic is dropped so that the aggregate rate R is enforced across H and L (steps 32 and 34), and no traffic is dropped from H. If H>R traffic is also dropped from queue H so that the aggregate rate R is enforced (steps 32 and 36).

Figure 3:
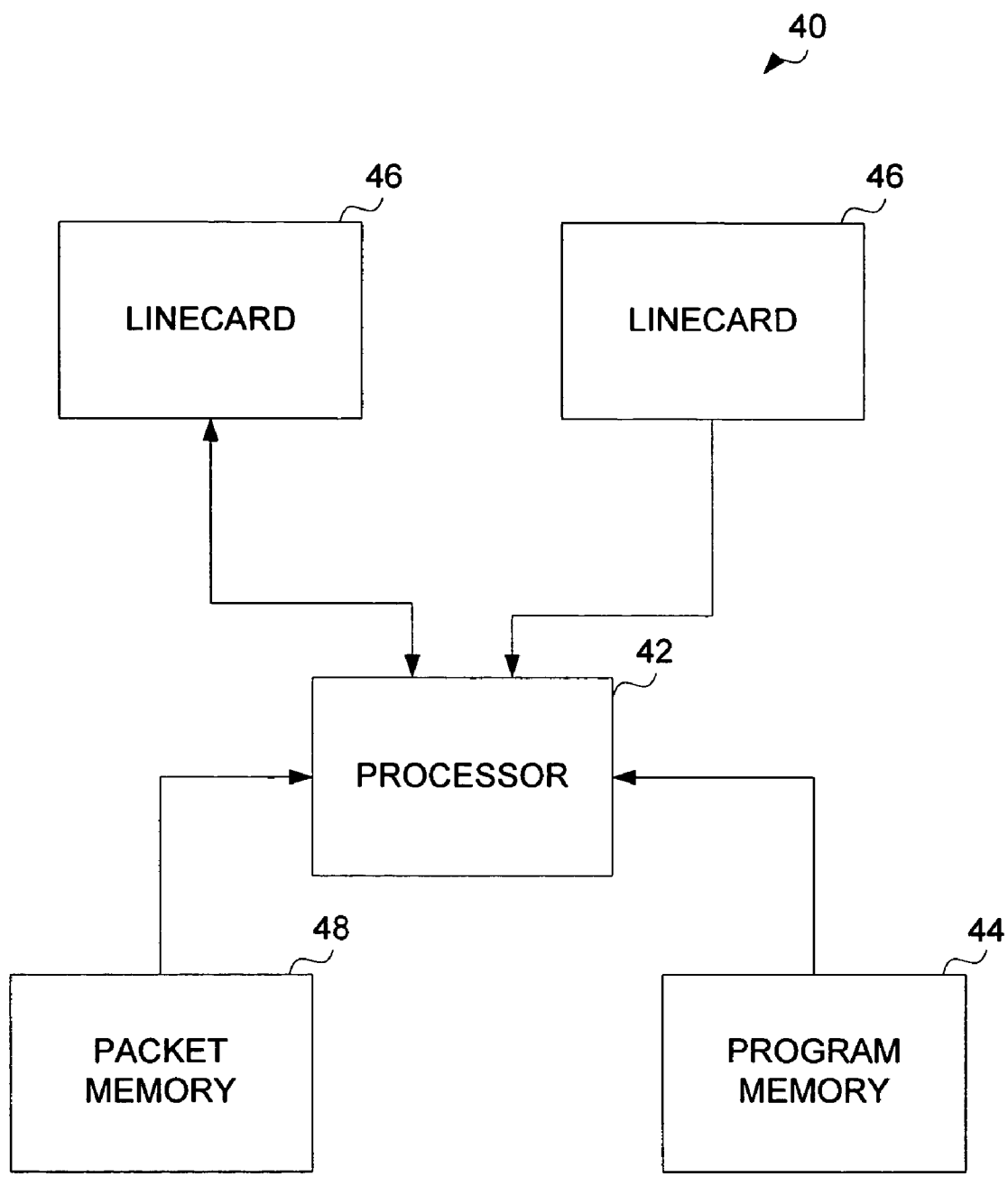
FIG. 3 depicts a network device useful in implementing embodiments of the present invention.

FIG. 3 depicts a network device 40 that may be used to implement a device that operates the hierarchies shown in FIG. 1 and the scheduling technique of FIG. 2. In one embodiment, network device 40 is a programmable machine that may be implemented in hardware, software or any combination thereof. A processor 42 executes code stored in a program memory 44. Program memory 44 is one example of a computer-readable medium. Program memory 44 can be a volatile memory. Another form of computer-readable medium storing the same codes would be some type of non-volatile storage such as floppy disks, CD-ROMs, DVD-ROMs, hard disks, flash memory, etc.

Network device 40 interfaces with physical media via a plurality of linecards 46. Linecards 46 may incorporate Ethernet interfaces, DSL interfaces, Gigabit Ethernet interfaces, 10-Gigabit Ethernet interfaces, SONET interfaces, etc. As packets are received, processed, and forwarded by network device 40, they may be stored in a packet memory 48. Network device 40 implements all of the scheduling features provided by the present invention.

Packet transmission operations may occur partially or completely within one of linecards 46. To implement functionality according to the present invention, linecards 46 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A scheduling method at a network device, comprising:
receiving traffic at a root node in a multi-level class hierarchy, said root node linked to at least two groups, wherein one of said groups is a high priority group which has priority over the other of said groups and comprises at least one high priority queue and at least one low priority queue, said multi-level class hierarchy comprising a first level comprising the root node, a second level comprising said groups, and a third level comprising said queues;
directing the traffic received at said root node to one of said groups;
directing traffic received at said high priority group to one of said high priority and low priority queues;
determining an aggregate rate at said high and low priority queues; and
processing packets at the network device, wherein processing comprises:
accepting said packets at said high priority queue or said low priority queue if said aggregate rate does not exceed a specified rate;
dropping at least some of said packets at said low priority queue and not dropping said packets at said high priority queue if said aggregate rate exceeds said specified rate and a rate at said high priority queue does not exceed said specified rate; and dropping at least some of said packets at said high priority queue if said rate at said high priority queue exceeds said specified rate;

wherein said high priority queue comprises a priority propagation attribute and said priority propagation attribute allows a priority indication to be passed from a node to its parent on a per-packet basis so that low latency behavior is delivered through said hierarchy.

2. The method of claim 1 wherein packets are dropped at said high priority queue and said low priority queue if said high priority queue exceeds a specified burst.

3. The method of claim 1 wherein the low priority queues comprises a small tail-drop limit.

4. The method of claim 1 wherein said two groups share a bandwidth allocated to said root node.

5. The method of claim 1 wherein the other of said groups comprises at least four queues, one of said queues designated as a class-default queue.

6. The method of claim 1 wherein traffic at said high priority group is shaped at said specified rate corresponding to an aggregate bandwidth, and an aggregate burst.

7. The method of claim 1 further comprising passing a priority indication on a per-packet basis from said high priority queue to said high priority group.

8. The method of claim 7 wherein determining an aggregate rate comprises determining an aggregate rate and an aggregate burst and wherein said packets are dropped if said aggregate rate or said aggregate burst exceeds said specified rate or a specified burst.

9. The method of claim 1 wherein said aggregate rate is based on traffic received at said high and low priority queues.

10. A non-transitory computer-readable medium encoded with computer instructions which when executed cause the computer to perform a scheduling method, the method comprising:

receiving traffic at a root node in a multi-level class hierarchy, said root node linked to at least two groups, wherein one of said groups is a high priority group which has priority over the other of said groups and comprises at least one high priority queue and at least one low priority queue, said multi-level class hierarchy comprising a first level comprising the root node, a second level comprising said groups, and a third level comprising said queues;

directing the traffic received at said root node to one of said groups; and directing traffic received at said high priority group to one of said high priority and low priority queues;

determining an aggregate rate at said high and low priority queues;

accepting packets at said high priority queue or said low priority queue if said aggregate rate does not exceed a specified rate:

dropping at least some packets at said low priority queue and not dropping packets at said high priority queue if said aggregate rate exceeds said specified rate and a rate at said high priority queue does not exceed said specified rate; and dropping at least some of said packets at said high priority queue if said rate at said high priority queue exceeds said specified rate:

wherein said high priority queue comprises a priority propagation attribute, and said priority propagation attribute allows a priority indication to be passed from a node to its parent on a per-packet basis.

11. The non-transitory computer-readable medium of claim 10 wherein packets are dropped at said high priority queue and said low priority queue if said high priority queue exceeds a specified burst.

12. The non-transitory computer-readable medium of claim 10 wherein the low priority queues comprises a small tail-drop limit.

13. The non-transitory computer-readable medium of claim 10 wherein said two groups share a bandwidth allocated to said root node.

14. The non-transitory computer-readable medium of claim 10 wherein the other of said groups comprises at least four queues, one of said queues designated as a class-default queue.

15. A scheduling system comprising:

means for receiving traffic at a root node in a multi-level class hierarchy, said root node linked to at least two groups, wherein one of said groups is a high priority group which has priority over the other of said groups and comprises at least one high priority queue and at least one low priority queue, said multi-level class hierarchy comprising a first level comprising the root node, a second level comprising said groups, and a third level comprising said queues;

means for directing the traffic received at said root node to one of said groups;

means for directing traffic received at said high priority group to one of said high priority and low priority queues; and means for determining an aggregate rate at said high and low priority queues;

wherein packets are accepted at said high priority queue or said low priority queue if said aggregate rate does not exceed a specified rate, at least some packets are dropped at said low priority queue and not dropped at said high priority queue if said aggregate rate exceeds said specified rate and a rate at said high priority queue does not exceed said specified rate, and at least some packets are dropped at said high priority queue if said rate at said high priority queue exceeds said specified rate;

wherein said high priority queue comprises a priority propagation attribute and said priority propagation attribute allows a priority indication to be passed from a node to its parent on a per-packet basis so that low latency behavior is delivered through said hierarchy.

16. The scheduling system of claim 15 wherein the low priority queues comprises a small tail-drop limit.

17. The scheduling system of claim 15 wherein said two groups share a bandwidth allocated to said root node.

18. The scheduling system of claim 15 wherein the scheduling system is configured such that said high priority queue is not impacted by jitter.

* * * * *